United States Patent [19]

Isaksson et al.

[11] 4,007,251
[45] Feb. 8, 1977

[54] METHOD OF MANUFACTURING POWDER BODIES OF BORIDES, CARBIDES OR NITRIDES

[75] Inventors: Sven-Erik Isaksson; Jan Adlerborn; Hans Larker, all of Robertsfors, Sweden

[73] Assignee: Allmanna Svenska Elektriska Aktiebolaget, Vasteras, Sweden

[22] Filed: Oct. 25, 1974

[21] Appl. No.: 518,150

Related U.S. Application Data

[63] Continuation-in-part of Ser. No. 396,481, Sept. 12, 1973, abandoned.

[30] Foreign Application Priority Data

Sept. 19, 1972 Sweden ............................ 12053/72

[52] U.S. Cl. ............................... 264/332; 106/73.3
[51] Int. Cl.$^2$ .................. C04B 35/60; C04B 35/58
[58] Field of Search .............. 264/332, 65; 106/73.3

[56] References Cited

UNITED STATES PATENTS 3,003,885  10/1961  Mandorf ............................ 264/332
3,419,935  1/1969  Pfeiler et al. ...................... 264/332

FOREIGN PATENTS OR APPLICATIONS 1,010,492  11/1965  United Kingdom .............. 264/332

OTHER PUBLICATIONS

Brewer et al., "A Study of the Refractory Borides," J. Am. Cer. Soc., vol. 34, 6, pp. 173–179 (1951).

Primary Examiner—Robert F. White
Assistant Examiner—John Parrish
Attorney, Agent, or Firm—Watson, Cole, Grindle & Watson

[57] ABSTRACT

For hydrostatically hot pressing bodies of borides, carbides or nitrides of titanium, zirconium or chromium from a powder having an excess of boron, carbon or nitrogen, the power is enclosed in a sealed container of a material which forms compounds with boron, carbon or nitrogen which have a melting point at least equal to that of the material of the container. Container materials may be for example metals from Group IVb of the Periodic System, particularly titanium and zirconium or their alloys in the case of titanium or chromium compounds and zirconium or zirconium base alloys in the case of zirconium compounds. This allows pressing at temperatures of up to 1700°–1800° C, which is high enough to cause bonding between the powder grains.

3 Claims, No Drawings

METHOD OF MANUFACTURING POWDER BODIES OF BORIDES, CARBIDES OR NITRIDES

RELATED APPLICATIONS

The application is a continuation-in-part of application Ser. No. 396,481, filed Sept. 12, 1973, now abandoned.

BACKGROUND OF THE INVENTION

1. Field of the Invention

The present invention relates to a method of manufacturing bodies by hydrostatic compression of borides, carbides or nitrides of titanium or zirconium or chromium, starting from a powder which, besides one or more borides, carbides or nitrides, also may contain an excess of boron, carbon or nitrogen.

2. The Prior Art

When hot pressing powder bodies of the substances mentioned above, the container materials which have normally been used have lost their sealing properties at high pressing temperatures. It has therefore proved difficult or impossible to obtain the desired density in the pressed powder body by means of hot pressing. The container materials used, usually iron, chromium or nickel, are attacked by the powder material boron, carbon or nitrogen, forming therewith compounds having considerably lower melting points than the container material. In this way permeability arises, causing pressure medium to leak into the container. The intended compression and bonding is therefore not achieved. By limiting the temperature to values below that at which the container material is destroyed, the necessary bonding between the powder grains is not obtained, nor the desired density.

SUMMARY OF THE INVENTION

According to the invention, powder or a pre-shaped body of powder is introduced into and sealed in a container consisting essentially of a material which forms compounds with boron, carbon or nitrogen, said compounds having a melting point which is equal to or exceeds the melting point of the container material. Metals from group IVb of the Periodic System have this property. Particularly suitable metals are titanium or zirconium and alloys based on these metals, that is, alloys in which the majority ingredient is titanium or zirconium. Pressing temperatures of up to 1700° to 1800° C are achievable.

DESCRIPTION OF THE PREFERRED EMBODIMENTS

When manufacturing bodies of titanium diboride from a powder having an excess of boron, a container of titanium or zirconium may be used and the pressure should exceed 700 bar, the temperature 1350° C and the time 0.5 hours. The pressing is suitably performed at 700 – 3000 bar, at 1350°–1500° C and for 0.5 – 10 hours. When manufacturing bodies of titanium boronitride from a powder having an excess of boron and/or nitrogen, a titanium-or zirconium container may be used and the pressure should exceed 700 bar, the temperature 1300° C and the time 0.1 hour. The pressing is suitably performed at 700 – 3000 bar at 1300°–1600° C for 0.1 – 10 hours. When manufacturing boronitride bodies from a boronitride powder having an excess of boron or nitrogen, the pressure should exceed 200 bar, the temperature 1200° C and the time 0.1 hour. The pressing is suitably carried out at 200 – 3000 bar, 1200° – 1600° C for 0.1 – 10 hours. When manufacturing bodies of boron carbide from a boron carbide powder containing an excess of free boron and/or free carbon, the pressure should exceed 1000 bar, the temperature 1400° C and the time 0.5 hours. The pressing is suitably carried out at 1000 – 3000 bar, 1400° – 1750° C for 5 – 10 hours. When manufacturing bodies of titanium carbide from a powder having an excess of carbon the pressure should exceed 700 bar, the temperature 1350° C for at least 0.5 hours. The pressing is suitably carried out at 700 – 3000 bar, 1350° – 1750° C for 0.5 – 10 hours.

The following are examples of methods embodying the invention

---

1. Powder: Titanium carbide (TiC)
   Container: Titanium (Ti)
   Temperature: 1450° C
   Pressure: 2000 bar
   Pressing Time: 3 hours
   Achieved product density: 100% of theoretical density 2. Powder: Titanium diboride (TiB$_2$)
   Container: Titanium (Ti)
   Temperature: 1450° C
   Pressure: 2750 bar
   Pressing Time: 3 hours
   Achieved product density: 100% of theoretical density 3. Powder: Chromium diboride (CrB$_2$)
   Container: Titanium (Ti)
   Temperature: 1350° C
   Pressure: 1700 bar
   Pressing time: 2 hours
   Achieved product density: 100% of theoretical density 4. Powder: Zirconium diboride (ZrB$_2$)
   Container: Zirconium (Zr)
   Temperature: 1350° C
   Pressure: 1000 bar
   Pressing time: 2 hours
   Achieved product density: 100% of theoretical density.

---

Titanium boronitride (TiB$_2$N), boronitride (BN), and boroncarbide (B$_4$C) can also be pressed by this method. However, with the pressures and temperatures presently available in the pressure furnaces which applicant can use, these cannot be produced at a high density.

Zirconium diboride (ZRB$_2$) likewise cannot be handled in a container of titanium (Ti). It may be that zirconium-titanium compound is formed which attacks the container and makes it permeable to gas, which would make the container leaky so that no compaction can be obtained.

Titanium- and zirconium-base alloys are those in which titanium or zirconium makes up the greater part of the alloy.

As regards the utility of the products of this application TiB$_2$, CrB$_2$, ZB$_2$, TiC are all very hard and wear-resistant materials and bodies made of these materials are very strong, especially when the bodies have a very high density, that is a density equal to or very near are theoretical density of the compact material. Bodies of these materials are very useful for cutting tools as tool bits in the same way as tool bits of hard metals (sintered carbide tool bits with metal carbides in a matrix of a softer metal). The material can be used in turning tools, milling tools, rock drills, and the like. TiB$_2$ does not give sparks and for this reason tool bits of this material are very attractive for drills and other cutting tools in coal mines. The risks of explosions are reduced.

Further, the materials are conductive and very resistant to corrosion, even at high temperatures. For this reason they can be used as electrodes for electrolytic conduction at high temperatures.

BN has a very high melting point and is very resistant to most molten metals. It is also a non-conductor. It is possible to use the material in air up to 1400° C and in vacuum or a reducing atmosphere up to 2800° C. It can be used for crucible melting pots and for construction elements in high temperature furnaces.

We claim:

1. A method of manufacturing bodies of borides of titanium from a powder possibly having an excess of boron, which comprises enclosing said powder in a container selected from the group consisting of titanium and titanium base alloys, said container forming with boron, compounds which have a melting point at least equal to that of said container, and isostatically hot pressing said container.

2. Method as claimed in claim 1, in which the powder is titanium diboride ($TiB_2$) powder containing an excess of boron (B), and is hot pressed at at least 700 bar, at at least 1350° C for at least 0.5 hours.

3. Method as claimed in claim 2, which includes hot pressing the container at 700–3000 bar at 1350°–1500° C and for 0.5–10 hours.

* * * * *